United States Patent Office 2,810,738
Patented Oct. 22, 1957

2,810,738
COLLOIDAL ORGANO-SILICON POLYMERS

George H. Slack, Hammond, Ind., and Kenneth B. Copeland, Flossmoor, Ill., assignors to Copeland & Slack, Inc., Harvey, Ill., a corporation of Illinois No Drawing. Application April 2, 1953,
Serial No. 346,511

4 Claims. (Cl. 260—448.8)

This invention relates to novel colloidal organo-silicon polymers as distinguished from granular silica compounds.

An object and accomplishment of this invention is to delineate a method for making a number of organo-silicon polymers.

In accordance with the teachings of this invention colloidal silica is employed as a source of silicon and is combined with water soluble organic compounds containing two or more hydroxyl groups. The combination reactions of the aforementioned ingredients are effectively accomplished by the aid of heat. Moreover, heat is employed not only to effect the desirable combination but to eliminate water from the solution. Catalysts may be employed to speed the reaction but are unnecessary.

The invention contemplates the provision of water soluble compounds and others that are readily soluble in solvents.

The water soluble and water dispersible polymers contemplated by this invention have been under severe test under regular commercial conditions as a constituent of a rolling, extrusion and parting compound for cold metal working.

Example I

| | Parts |
|---|---|
| Ethylene glycol | 186 |
| Colloidal silica solution (30% solid count) | 400 |

Heat is applied and maintained at a temperature of 220 degrees F. until polymerization has taken place. A clear unctuous (i. e., characterized by a thickened state or increased viscosity as compared with the initial reactants) water white polymer is formed that is soluble in water.

Example II

| | Parts |
|---|---|
| Polyalkylene glycol (200 molecular weight) | 124 |
| Colloidal silica solution (30% solid count) | 200 |

Heat is applied and at a temperature of approximately 175 degrees F. polymerization takes place. Application of heat is continued to remove excess water. An opaque polymer insoluble in water but soluble in some solvents or mixtures thereof is formed.

From the foregoing disclosure, it may be observed that we have provided colloidal organo-silicon polymers which efficiently fulfill the objects thereof as herein before set forth and which provide numerous advantages which may be summarized as follows:

(1) Efficient and durable having properties of high temperature lubricity;

(2) Economical to manufacture and readily adaptable to mass production manufacturing principles;

(3) The provision of a colloidal organo-silicon polymer which may be advantageously employed as a constituent of a rolling, extrusion and parting compound for cold metal working; and (4) The provision of a method of preparing polymeric materials by reacting a colloidal silica solution with water soluble organic compounds containing two or more hydroxyl groups.

The present application is a continuation-in-part of our copending application Serial No. 297,971 filed July 9, 1952, now abandoned which is directed toward compositions for reduction rolling of ferrous and non-ferrous metals.

While we have described preferred components in effecting the subject combination, modification may be made without departing from the spirit of the invention, and we do not wish to be limited to the precise details set forth but wish to avail ourselves of all changes within the scope of the appended claims.

We claim:

1. A polymer containing silicon formed by reacting ethylene glycol and silica in a colloidal state in water under the influence of heat at a temperature above about 200° F. until a clear unctuous water-white polymer is produced which is soluble in water.

2. A composition comprising a polymer containing silicon resulting from heating about 186 parts by weight of ethylene glycol and about 400 parts by weight of a solution consisting essentially of water containing approximately 30% by weight of colloidal silica dispersed therein to a temperature of around 220° F. until polymerization has taken place to produce a clear unctuous water-white polymer which is soluble in water.

3. A process of preparing organic polymeric materials containing silicon which comprises heating silica in a colloidal state in water with ethylene glycol at a temperature above about 200° F. until a clear, unctuous water-white polymer is produced which is soluble in water.

4. A process of preparing organic materials containing silicon which comprises heating about 186 parts by weight of ethylene glycol and about 400 parts by weight of a solution consisting essentially of water containing approximately 30% by weight of colloidal silica dispersed therein to a temperature of about 220° F. until polymerization has taken place to produce a clear unctuous water-white polymer which is soluble in water.

References Cited in the file of this patent

UNITED STATES PATENTS

| | | |
|---|---|---|
| 1,178,731 | Knorr | Apr. 11, 1916 |
| 1,977,448 | Lyon | Oct. 16, 1934 |
| 2,027,931 | Ray | Jan. 14, 1936 |
| 2,048,799 | Lawson | July 28, 1936 |
| 2,392,767 | Robinson | Jan. 8, 1946 |
| 2,395,880 | Kirk | Mar. 5, 1946 |
| 2,430,083 | Sherman | Nov. 4, 1947 |
| 2,563,606 | Kimberlin | Apr. 7, 1951 |
| 2,569,747 | Culbertson | Oct. 2, 1951 |
| 2,630,446 | Gresham | Mar. 3, 1953 |
| 2,680,696 | Broge | June 6, 1954 |

FOREIGN PATENTS

| | | |
|---|---|---|
| 1,001,536 | France | Oct. 24, 1951 |